April 10, 1928.
A. C. EKMAN
1,665,915
PIPE SWAGING DEVICE
Filed Dec. 21, 1925
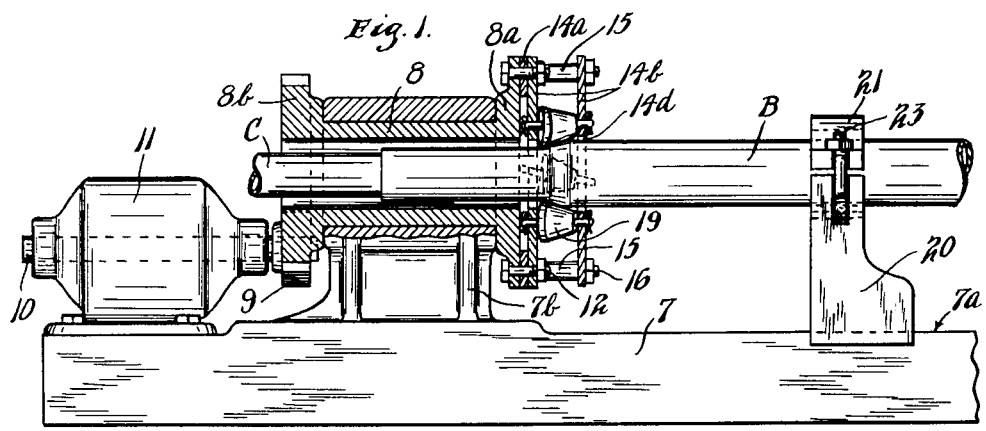
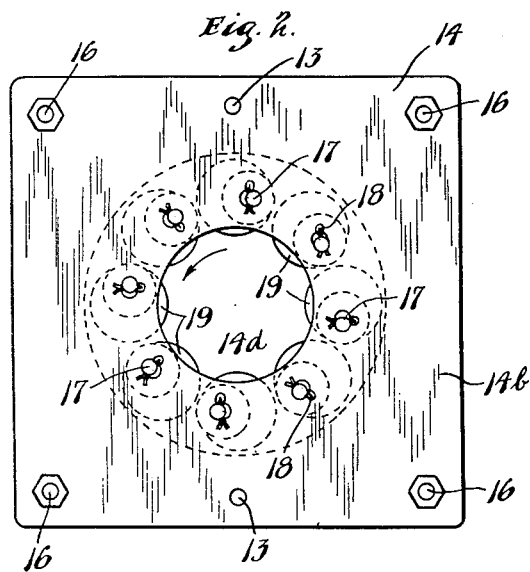
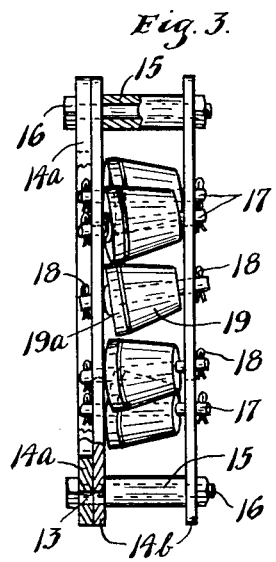
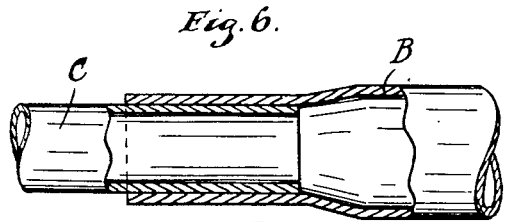
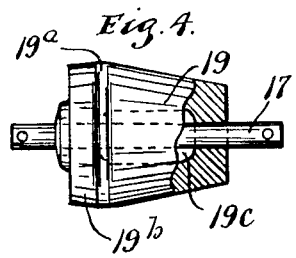
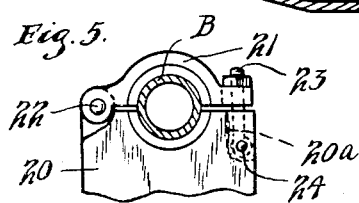
INVENTOR.
A. C. EKMAN.
BY HIS ATTORNEYS.

Patented Apr. 10, 1928.

1,665,915

UNITED STATES PATENT OFFICE.

ALBERT C. EKMAN, OF MINNEAPOLIS, MINNESOTA.

PIPE-SWAGING DEVICE.

Application filed December 21, 1925. Serial No. 76,641.

This invention relates to a machine for operating on pipe, and particularly to a pipe swaging machine. While the machine is adapted to swage pipe for various purposes, it particularly is designed for swaging a pipe into contact with a smaller pipe so as to provide a tight joint or connection between the two pipes. It has been one common practice to connect pipes by a threaded joint. This however, weakens the pipe and the same are very apt to break off at the end of the threads cut thereon. The circumferential cut through the outer shell of the pipe greatly weakens the same. Pipes have also sometimes been swaged together by hand forging. This is so difficult and expensive, however, as to be impracticable.

It is an object of the present invention to provide a simple and efficient machine comprising a plurality of circumferentially arranged rollers so formed and disposed as to quickly swage the pipe into proper condition.

It is a further object of the invention to provide such a machine having a head with a passage therethrough through which the pipe may be passed, a rotating member at one end of said head carrying a series of circumferentially arranged rollers adapted to contact the pipe and be rotated concentrically therewith, said rollers preferably being conical in shape and inclined to the axis of rotation.

It is still another object of the invention to provide a machine, as set forth in the preceding paragraph, in which the axes of the rollers incline toward their front ends in a direction opposite to the rotation of the rotating member.

It is more specifically an object of the invention to provide a pipe swaging machine comprising a frame having a head thereon with an opening therethrough through which the pipe may be passed, a rotating member at one end of said head having revolubly mounted therein a series of rollers having rearwardly tapering rear ends with short substantially cylindrical portions adjacent said rear ends and tapering forwardly from said portions, the axes of said rollers at their said front and rear ends being substantially the same distance from the axis of rotation, said axes being fixed but inclining toward their front ends in a direction opposite to the direction of rotation of said rotating member, together with a slide on said frame having means therein clamping a pipe therein in concentric relation to said series of rollers.

These and other objects and advantages of the invention will be fully set forth in the following description made in connection with the accompanying drawings in which like reference characters refer to the same parts throughout the different views, and in which, Fig. 1 is a view partly in vertical section and partly in side elevation of the machine;

Fig. 2 is a view in front elevation of a rotating member used;

Fig. 3 is a view in side elevation, partly in vertical section of said rotating member;

Fig. 4 is a view in side elevation partly in vertical section, of one of the rollers used;

Fig. 5 is a view in end elevation of a portion of the slide and pipe clamping means, the pipe being shown in vertical section there in; and Fig. 6 is a view partly in side elevation and partly in central vertical section of a pair of pipes swaged on the machine.

Referring to the drawings, in Fig. 1, a machine is shown having a frame or bed portion 7. While this frame may be of various forms, in the embodiment of the invention illustrated, it is shown as having a slideway $7^a$ at one end and a head $7^b$ adjacent its other end, which head is bored to receive a rotating sleeve 8. The sleeve 8 carries a face plate $8^a$ at its forward end and is formed with a gear $8^b$ at its other end. The gear $8^b$ is adapted to mesh with pinion 9 carried on the motor shaft 10 of a motor 11 also illustrated as mounted on the frame of bed 7. The face plate $8^a$ is provided with spaced holes through which pass headed and nutted clamping bolts 12, which bolts are adapted to pass through holes 13 in the rear portion of a rotating member or holder 14. The member 14 comprises a rear ring $14^a$ and spaced plates $14^b$. While the plates $14^b$ may be of various shapes, in the embodiment of the invention, they are illustrated as substantially square, being spaced by the sleeves or thimbles 15 through which pass the headed and nutted clamping bolts 16 shown as disposed adjacent each corner of plates $14^b$ and passing through the ring $14^a$ and plate $14^b$. The plates 14 each have a central circular opening $14^d$ therein. Extending between and through the plates $14^b$ are the pins or shafts 17 held in place by the cotter pins 18 disposed at the outer side of each of said plates. Journaled on the pins 17 are rollers 19. The pins 17 are circumferentially arranged, the centers of the holes through which the same pass in the plates 14ᵇ being on circles of equal diameter in both of the plates 14ᵇ. While the number of rollers 19 is varied according to the size of pipe operated on, in the embodiment of the invention illustrated, eight of these rollers are shown. The member 14 is adapted to rotate, as indicated by the arrow in Fig. 2, and the holes in the front plate 14ᵇ through which pin 17 passes are offset somewhat relatively to the holes in the rear plate 14ᵇ in a direction opposite to the direction of rotation of member 14 so that the axes of pins 17 incline toward their front ends in a direction opposite to the direction of rotation of member 14. While rollers 19 might be somewhat varied in shape, in the embodiment of the invention illustrated, they are each shown as having a front tapering or frusto-conical surface, a short substantially cylindrical portion 19ᵃ with its surface merging in a curve into said surface and a rearwardly tapered portion 19ᵇ at its rear end having its surface also merging in a curve into the surface of portion 19ᵃ. The rollers are also hollowed or grooved at their centers, as shown at 19ᶜ.

A slide 20 is provided adapted to slide in the guideways 7ᵃ of the bed 7 and said slide, at its upper end, has a semi-cylindrical recess 20ᵃ therein above which is disposed a swinging cap 21 pivoted at 22, which cap has a downwardly disposed semi-cylindrical recess arranged co-axial with the recess 20ᵃ. The free end of the cap 21 is slotted to embrace a nutted clamping bolt 23 having an eye at its lower end and disposed in recess 20ᵃ by which it is hinged on a suitable pivot 24 in the upper end of slide 20.

In operation, when the two pipes are to be swaged together, the end of the larger pipe will be heated. The larger pipe shown as B in Figs. 1, 5 and 6 will be clamped in the slide 20. The smaller pipe will then have its end disposed the desired distance in the heated end of pipe B, said smaller pipe being suitably supported at its other end. The motor 11 will now be started and sleeve 8 and the member 14 will be rotated, as illustrated, in a counter-clockwise direction or in a direction opposite to that in which the front ends of the rollers are offset. The end of pipe B is now moved between the rollers 19 and when the rollers have securely engaged said pipe the same will be gripped and the pipe automatically be drawn lengthwise between the rollers and the pipe will be simultaneously swaged down by the rollers 19. The slide 20 is thus drawn along slideway 7ᵃ as the pipe is swaged. The rollers quickly and smoothly swage the pipe B down into close contact with the pipe C. Owing to the fact that the axes of the rollers 19 are not parallel to the axis of the pipe, the surface of the portion 19ᵃ of the rollers is quite short and the rear end of the rollers is tapered substantially at the same angle at which the axis of the rollers is inclined to the axis of the pipe B. The roller is so shaped to prevent the rolling of grooves or threads in the pipe. With the roll shaped, as shown, the pipe is swaged smoothly into cylindrical form. After the pipe B has been swaged down to the end of pipe C the motor is reversed and the pipes are then fed forwardly from member 14 and removed from between the rollers 19. The rollers are hollowed or grooved at their centers to contain a heavy grease, tending to cool the same.

A very tight, strong and efficient joint is thus made between the pipes and the work is very quickly and conveniently done. The joint made is perfectly tight and tests have been made with water under great pressure therein without developing any leaks. Actual tests, also with the joints made in the machine have shown that the pipe will be twisted in two before the joint will fail. The above described automatic feeding movement of the pipe is produced by having the axes of the rollers 19 incline toward their front ends in a direction opposite to the direction of the rotation of the member 14.

The present structure was arrived at after a great deal of experiment with other forms of swaging members. With cylindrical rollers it was found that the metal would flow ahead of the rollers. Corrugated rollers were then tried out without success. Conical rollers with their axes parallel to the axis of the pipe were tried but such a powerful feed was necessary to force the pipe through between the rollers that the machine was impracticable and the heat would be lost before the work could be completed. By having the rollers of the form shown and inclining the axes, as described, success was attained and the machine has proven to be very successful and efficient. Such swaged pipe joints now have very wide use in forming tapering poles for various purposes, such as lamp posts, street signs, radio aerials and various kinds of poles for supporting trolley wires and other electric wires. The joint, as stated, is made without causing any nicks or cuts in the surface of the pipe and the whole original strength of the pipe is maintained.

From the above description it is seen that applicant has provided a very simple and efficient pipe swaging machine. The device is easily constructed and the same can be easily and quickly operated. As stated, the device has been actually demonstrated in actual practice and found to be very successful.

It will, of course, be understood, that various changes may be made in the form, details, arrangement and proportions of the parts without departing from the scope of applicant's invention, which generally stated, consists in a device capable of carrying out the objects above set forth, in the novel parts and combinations of parts disclosed and defined in the appended claims.

What is claimed is:

1. A machine for swaging one pipe on a smaller pipe having in combination, a frame, a member slidable on said frame having means receiving and clamping one of said pipes to hold the same against rotation, a rotating head on said frame having an opening therein, coaxial with said means, adapted to receive said pipes in telescoping relation, said head carrying a plurality of circumferentially spaced rollers tapered toward their ends, said rollers being freely revoluble in said head and having their axes inclined to the axis of said head with their front ends offset in a direction opposite to the direction of rotation of said head, and means for rotating said head whereby said pipe and said first mentioned member are automatically drawn into said head and said larger pipe swaged down onto said smaller pipe and connected thereto.

2. A machine for swaging one pipe on a smaller pipe comprising a revoluble head having an opening therethrough through which the pipes project in telescoping relation, means for supporting one of said pipes and holding the same against rotation, a series of circumferentially spaced rollers having tapered ends carried in said head and journaled for free rotation therein, said rollers surrounding said pipes, said rollers having their axes inclined to the longitudinal axis of said head and having their front ends offset in a direction opposite to the rotation of said head and means for rotating said head and rollers bodily as a unit about said pipes concentrically therewith, whereby said outer pipe is swaged down on said smaller pipe and said larger pipe is drawn into said head by the action of said rollers.

In testimony whereof I affix my signature.

ALBERT C. EKMAN.